(12) United States Patent
Dell'Acqua et al.

(10) Patent No.: US 7,397,832 B2
(45) Date of Patent: Jul. 8, 2008

(54) LASER CAVITY PUMPING METHOD AND LASER SYSTEM THEREOF

(75) Inventors: Stefano Dell'Acqua, Pavia (IT); Giuliano Piccinno, San Martino Siccomario (IT)

(73) Assignee: Trumpf Laser Marking Systems AG, Gruesch (CH)

( * ) Notice: Subject to any disclaimer, the term of this patent is extended or adjusted under 35 U.S.C. 154(b) by 189 days.

(21) Appl. No.: 10/505,864

(22) PCT Filed: Feb. 27, 2003

(86) PCT No.: PCT/IB03/00747

§ 371 (c)(1),
(2), (4) Date: Oct. 27, 2004

(87) PCT Pub. No.: WO03/073564

PCT Pub. Date: Sep. 4, 2003

(65) Prior Publication Data

US 2005/0152426 A1    Jul. 14, 2005

(30) Foreign Application Priority Data

Feb. 28, 2002    (IT)    ............ TO2002A0173

(51) Int. Cl.
*H01S 3/14*    (2006.01)
*H01S 3/08*    (2006.01)
(52) U.S. Cl. .......................... 372/39; 372/99
(58) Field of Classification Search .......... 372/69, 372/92, 99, 39
See application file for complete search history.

(56) References Cited

U.S. PATENT DOCUMENTS

| | | | |
|---|---|---|---|
| 5,130,996 A | 7/1992 | Amano et al. | |
| 5,446,750 A | 8/1995 | Ohtsuka et al. | |
| 5,511,085 A * | 4/1996 | Marshall | ............ 372/22 |
| 6,327,291 B1 | 12/2001 | Marshall | |

FOREIGN PATENT DOCUMENTS

DE    4039455    6/1992

(Continued)

OTHER PUBLICATIONS

Berger et al., "High Power, High Efficient Neodymium: YYTRIM aluminum garnet laserend pumped by a laser diode array", Applied Physics Letters, American Institute of Physics, New York, US, vol. 51, No. 16, Oct. 19, 1987, pp. 1212-1214.

(Continued)

*Primary Examiner*—Armando Rodriguez
(74) *Attorney, Agent, or Firm*—Fish & Richardson P.C.

(57) ABSTRACT

A pumping method of discrete elements solid state laser systems pumped by semiconductor laser diodes, which sends a pump beam through an active medium, comprising a first face first crossed by said pump beam, and a second face met as second by the pump beam, a pumping axis being associated to the pump beam, the active medium being inserted in a cavity to which a cavity propagation axis is associated. The pumping axis coincides with the cavity propagation axis inside the active medium, and is perpendicular to an optical surface met by the pump beam after crossing the active medium, the optical surface being at least partially reflecting at the wavelength of the pump beam.

44 Claims, 6 Drawing Sheets

FOREIGN PATENT DOCUMENTS

DE          4239654        3/1994
EP          0969574        1/2000

OTHER PUBLICATIONS

Berger et al., "Fibre-Bundle Coupled, Diode End-Pumped ND:YAG Laser", Optics Letters, Optical Society of America, Washington, US, vol. 13, No. 4, Apr. 1, 1988, pp. 306-308.

Liu et al., "Diode-Laser-Array End-Pumped Actively Q-Switched ND:GDV04 Laser at 1.06MUM formed with a Flat-Flat Resonator", Japanese Journal of Applied Physics, vol. 39, No. 10A, part 2, Oct. 1, 2000, pp. I.978-I.980.

Sato et al., "Double-Pass-Pumped TM:YAG Laser with a simple cavity configuration", Applied Optics, Optical Society of America, Washington, US, vol. 37, No. 27, Sep. 20, 1998, pp. 6395-6400.

International Preliminary Examination Report from the corresponding PCT application, Mailed Aug. 2, 2004.

* cited by examiner

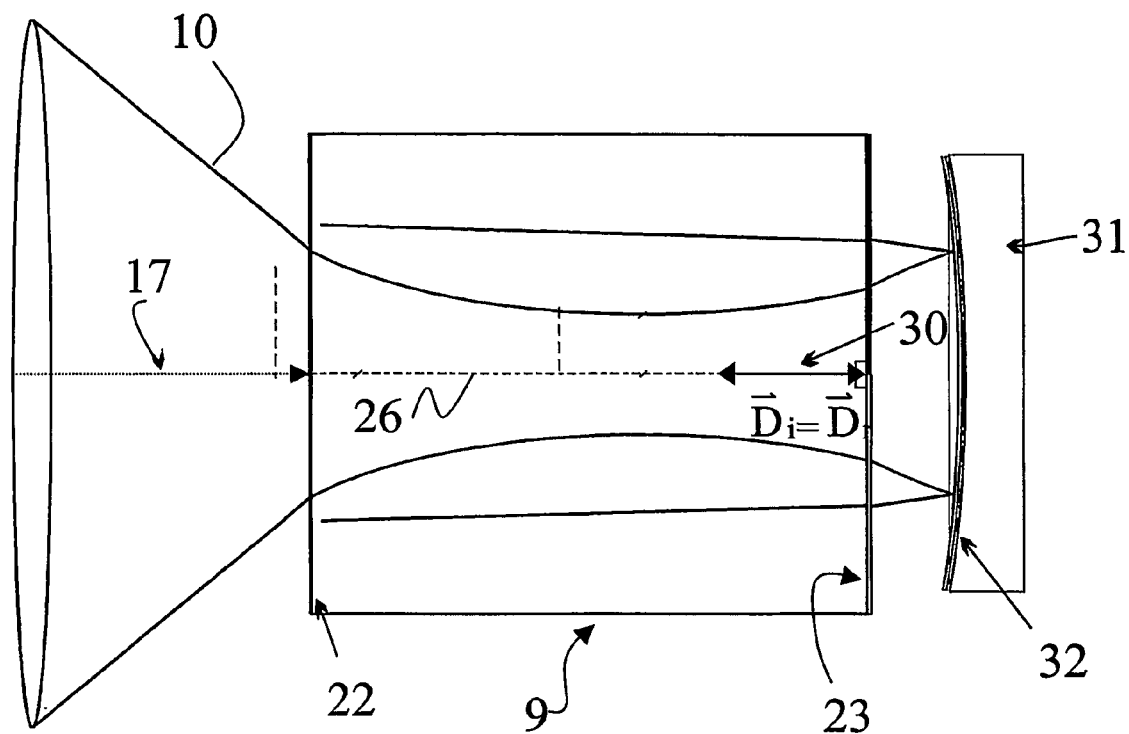
Fig. 3
Fig. 4
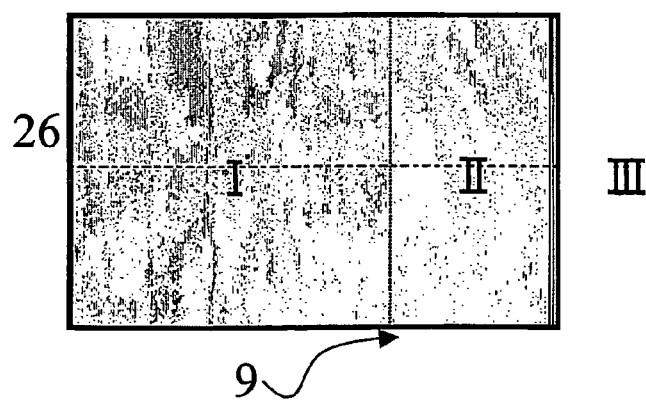

LASER CAVITY PUMPING METHOD AND LASER SYSTEM THEREOF

BACKGROUND OF THE INVENTION

The present invention relates to a pumping method of discrete elements solid state laser systems pumped by semiconductor laser diodes, which sends a pump beam through an active element comprising a first face first crossed by said pump beam, and a second face met as second by said pump beam, a pumping axis being associated to the pump beam, the active element being inserted in a cavity to which a cavity propagation axis is associated to.

An apparatus developed according to the above method is also described by way of a non limiting example. Operation of such an apparatus can be in a continuous wave or pulsed regime through appropriate modulation of the electromagnetic field in the cavity.

According to the conventional side pumping scheme of active crystal elements in solid state laser systems, the pumping light propagates and is absorbed into the active material along the crosswise direction to the propagation direction of the laser mode; the need of a long enough crosswise path of the pump light in the active element to warrant a high pump light absorption, i.e. efficient pumping, generally involves the energetic activation of a much larger section of the active element than the cross-section of the fundamental eigenmode of the stable cavity in which it operates and a consequent operation of the laser oscillator on several higher modes, which saturate power extraction. Once the absorption efficiency requirement of the pump light has been established, the laser systems so conceived do not ensure control of the number of higher order modes being excited, and consequently of the beam quality.

On the other hand, a so-called longitudinal pumping or end pumping technique is known, which ensures concentration of the gain area in the active medium inside the volume occupied by the fundamental mode, so as to cause oscillation on the mode $TEM_{0,0}$, the propagation of which occurs at the diffraction limit.

Thus, the pump energy is concentrated in a very restricted volume of active material with a length nearly equal to the absorption length of the pumping beam, with a cross section generally equalling the size of the focal spot. Through appropriate design provisions of the laser cavity, pumping optics and choice of the active material it is often possible for the volume activated by the pump energy to be included in the volume of the cavity fundamental mode $TEM_{0,0}$ and cause oscillation of the laser cavity on the cavity fundamental mode, or $TEM_{0,0}$, with a maximum energetic extraction efficiency as possible.

The rich literature available on the matter indicates that for limited pump powers (about <2 W), the optimal active volume for selecting $TEM_{0,0}$ in active media with strong thermo-optic or thermo-mechanical effects is nearly totally contained inside the fundamental mode itself, and the ratio between the laser mode diameter and the pump beam diameter in the active crystal may exceed the unit. These diameters are evaluated as the double distance from the propagation axis to the point where the beam intensity reaches $1/e^2$ times the peak value. Should it be wished, vice-versa, to increase the pump power, it would be necessary to reduce the ratio between the laser mode diameter and the pump beam diameter below the unit for limiting the strong losses due to the optical aberration on the edges of the so-called "thermal lens", which is due to the heat generated by the pump power absorbed in the active material. Thus, only the most external and energetically less significant circle of the cavity laser mode is subject to a non parabolic phase modulation and to the losses caused by repeated passes in the resonant cavity.

However, the value of the above overlaying ratio should remain next to the unit for selecting the fundamental mode $TEM_{0,0}$ and avoid oscillation of higher order modes. For a pumping power ranging between 20 W and 50 W, some sources specify a ratio of about 0.83 as the optimal value for selecting the fundamental mode. Based on this value, these sources indicate differential efficiencies (the ratio between the output power change and the pumping power change when the laser operates over the threshold) over 0.4 for operation on the fundamental mode utilizing $Nd:YVO_4$ as the active medium at 1064 nm laser wavelength.

At equivalent laser power being generated, the longitudinal pumping will be the most efficient one for producing solid state laser sources with a high beam quality, measured through the parameter $M^2$, i.e. operating near diffraction limit, with $M^2$ about 1, therefore featured by a high brightness. The source brightness (radiant power per surface unit per unit of solid angle) is proportional to the intensity (power per surface unit) obtainable by focusing the laser beam; therefore, it is a basic feature in the applications involving interaction with the materials, such as the ones of laser micromachining, marking and engraving. In these material processing applications, a high source brightness will ensure:

- a high interacting performance with various materials through the high irradiance that can be obtained;
- a high spatial resolution of the machining details through the high beam quality;
- high execution speed due to the high power available.

The ratio between the power available and the minimum size of the focal spot indicates the brightness of the laser source, defined as the power per unit of solid angle and surface. Quite generally, a high brightness laser will be more efficient than a low brightness laser when interacting with the material.

Therefore, solid state laser sources with a very high brightness are required, which are designed for their easy reconfiguration, in order to stress the beam quality or source average power feature for the specific requirements of the application they are used for.

It is particularly important to obtain such laser sources using Neodymium doped crystalline active materials, such as Nd:YAG, $Nd:YVO_4$, Nd:YLF, Nd:YAP, $Nd:GdVO_4$, Nd:BYF, Nd:SFAP or Ytterbium doped ones, such as Yb:YAG, Yb:YLF, Yb:SFAP.

Providing such a source entails some critical factors, which may represent some drawbacks and limit the extraction of the average powers required in the range between 2 and 100 W or compromise the beam quality required at such operating powers.

A first more relevant drawback is due to the pumping process and laser action, which deposits residual heat in the active material. In particular, the above phenomenon of thermal lens deteriorates laser power extraction, since the most external portion of the laser mode passing through the active material undergoes phase aberrations, which cause a net reduction of power circulating in the cavity, as well as a worsening of the laser beam quality.

In addition, operating a laser apparatus with an intensive thermal lens in a giant pulse operation, i.e. a repetitive Q-switching regime, may prove difficult.

SUMMARY OF THE INVENTION

It is the object of the present invention to solve the above drawbacks and provide a pumping method of laser systems having an improved manufacture and better efficiency compared to common solutions.

In this frame, it is the main object of the present invention to provide a pumping system of solid state laser systems, having a high performance and high brightness.

A further object of the present invention is to provide a pumping method of laser systems, which distributes absorption more uniformly inside the active crystal, utilizing more favorable local conditions for residual heat dissipation.

A further object of the present invention is to provide a pumping method of laser systems, which allows a considerable heat reduction in the active material through appropriate selection of the active material, doping parameters and pumping wavelength.

A further object of the present invention is to provide a pumping method of laser systems, which allows efficient counteraction of the limits caused by the thermal lens and thermal mechanical stress with the increasing pump power absorbed by the laser material, through appropriate selection of the physical structure of the active material and associated heat removal system.

A further object of the present invention is to provide a pumping method of laser systems, which allows efficient operation of a laser with a low modal contents also in giant pulse conditions.

A further object of the present invention is to provide a pumping method of laser systems, which is suitable for improving laser micro-machining and marking techniques.

In order to achieve such aims, it is the object of the present invention to provide a pumping method of laser systems incorporating the features of the annexed claims, which form an integral part of the description herein.

DESCRIPTION OF THE DRAWINGS

Further objects, features and advantages of the present invention will become apparent from the following detailed description and annexed drawings, which are supplied by way of non limiting example, wherein:

FIG. 3 shows a diagram of an embodiment of the pumping method of laser systems according to the present invention;

FIG. 4 shows a basic schematics of the active areas used by the pumping method of laser systems according to the present invention;

DESCRIPTION OF THE PREFERRED EMBODIMENT

The object of the present invention consists of an innovative structured pumping method co-linear to the resonator axis, specifically conceived for efficient operation of a laser cavity in a slightly multimode condition, with $M^2$ of the output beam contained between 1.3 and 6; this pumping method is conceived as a function of the development of a laser device characterised by its simplicity and high operating flexibility; additionally, it implies considerable advantages in terms of thermal dissipation and operating stability with the changing wavelength of the pump source.

Figure 1:
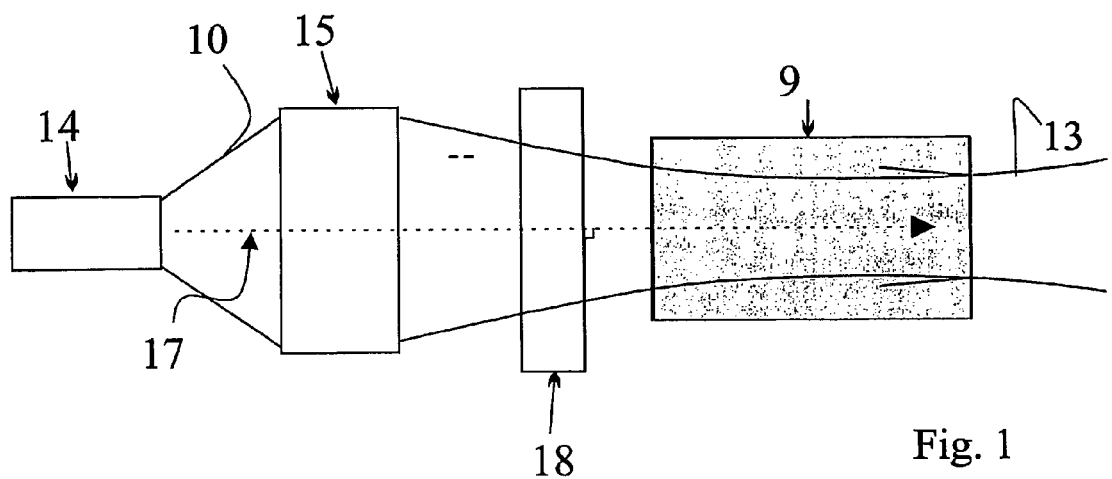
FIG. 1 shows a basic schematics of the pumping method of laser systems according to the present invention.

The pumping scheme provided by the method according to the present invention is schematically represented in FIG. 1; it consists of three separate subsystems, i.e. a pump source 14, a launching optic assembly 15 and an active medium 9 located inside a laser cavity.

The subsystem defined as the pump source 14 supplies a single light beam, i.e. the pump beam 10, which propagates along a pumping axis 17; the launching optic assembly 15 and active medium 9 are located along the pumping axis and may introduce alterations of such a direction.

Under the action of the pump beam 10, the active medium 9 generates a laser mode 13.

The pump source 14 consists of one or more diodes or semiconductor laser diode bars, a likely set of converting optics of the laser light emitted by the diodes, and of supply and cooling electric, electronic and thermal devices; each laser diode utilized operates at a temperature controlled (or not) wavelength, in the band comprised between about 790 nm and 990 nm; the system preferably uses wavelengths ranging between 795 nm and 822 nm and between 865 nm and 895 nm for pumping the absorption lines of Neodymium doped active materials, in particular Nd:YAG, Nd:YVO$_4$, Nd:YLF, Nd:YAP, Nd:GdVO$_4$; in the band between 900 nm and 990 nm for Ytterbium doped active materials. The pumping apparatus may also have more pump diodes or diode bars operating at different wavelengths.

The pump beam 10 is addressed inside the laser cavity by the launching optic assembly 15, which may alter or not the polarization state of the pump beam 10 making it linearly polarized in a well defined direction or elliptically polarized, i.e. casually polarized. The pumping axis 17, which is defined as the main propagation axis of the pump beam, coincides, within the system tolerances, with the optical axis of the laser cavity, which is defined as the main propagation direction of the cavity resonant laser beam.

As represented in the embodiment of FIG. 1, the pump beam 10 enters the laser cavity through a mirror 18, which has a high reflecting dielectric coating (typically R>99.%) at the laser wavelength on the face facing inside the cavity, and preferably a high transmission dielectric coating at the pumping wavelength on both faces.

Figure 2:
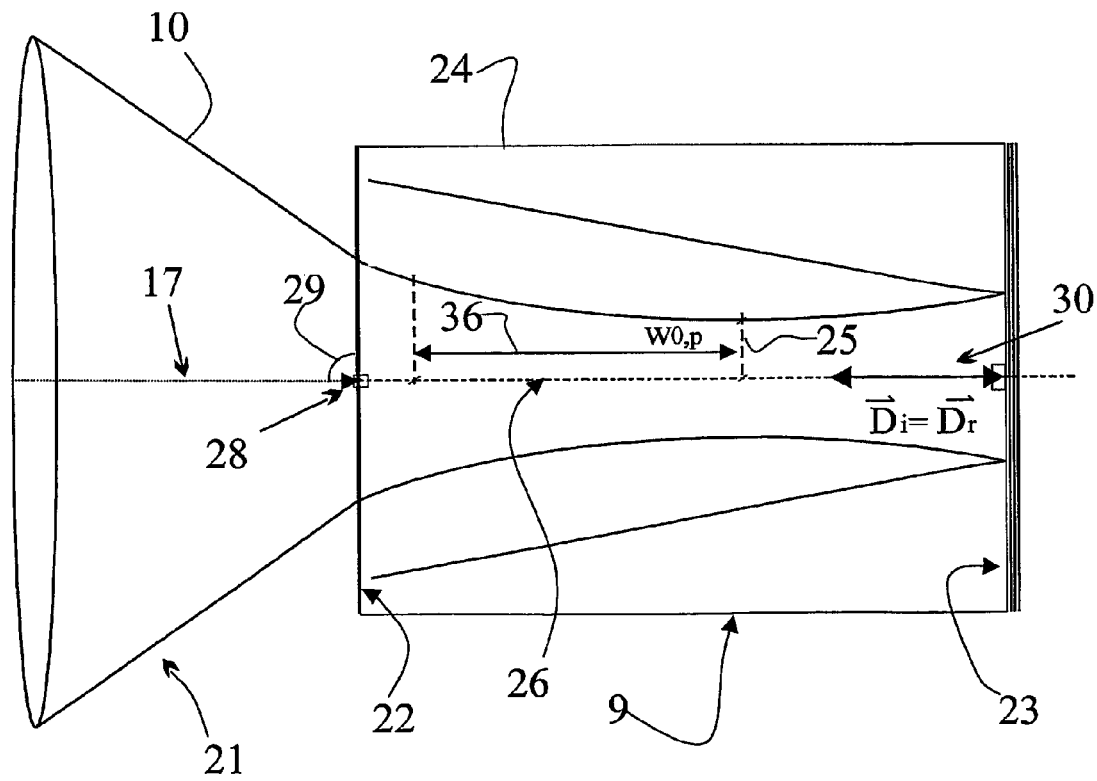
FIG. 2 shows a diagram of the pumping method of laser systems according to the present invention.

In FIG. 2 is represented a more detailed diagram of the pumping method according to the present invention. The active medium 9, i.e. the laser crystal, which may be in the form of a cylinder or parallelepiped, is located inside the laser cavity and along the path of the pump beam 10, with the pump beam 10 converging on the terminal faces. The preferential dimensions of the cylindrical crystal forming the active medium 9 consist of a round base 3 to 5 mm diameter and 5 to 60 mm length; the preferential dimensions of the parallelepiped crystal consist of a square base with the side 3 to 5 mm and 5 to 60 mm length. The pump beam 10 propagates lengthwise through the active medium 9 meeting its faces, i.e. a first face 22 and a second face 23 of the crystal, considering them with respect to the incidence order of the pump beam 10. Said faces 22 and 23 are preferably plane (but not limited to) and featured by the workmanlike machining of their optical surface; they can be parallel to each other within a: specified machining tolerance or mutually inclined by a greater angle than 0.1°.

The active medium 9 also has side faces 24, which are not involved by the cavity laser beam propagation. Said side faces 24 may be finished with a controlled roughness or machined with an optical quality for likely improvement of the total inner reflection of the pump beam 10. To this effect, the diameter of the circular base or square-sided base should preferably have but not necessarily a dimensions such not to interfere with propagation of the pump beam 10; the preferred value of these dimensions is 4 to 6 times a diameter, $2w_{0,p}$, of the pumping focal spot in the active medium 9, indicated with 25 in FIG. 2. However, the cross dimension of the crystal or active medium 9 may in certain cases be smaller than 4 times said diameter 25 and nearer to 1.5-2 times, or anyway have a value such to interfere with the pump beam 10 at any propagation point in the active medium 9; in this case, the pumping method according to the present invention requires the use of the side faces 24 of the active medium 9 to be optically polished for guiding the pump beam 10 along the absorption path by means of the so-called phenomenon of Total Internal Reflection (T.I.R).

According to the main feature of the pumping method of the present invention, the crystal forming the active medium 9 is so positioned to have the pumping axis 17 coincident with the cavity propagation axis 26 inside the active medium; should the second face 23 of the active medium 9 have a high reflectivity for the pump light from the beam 10, the pumping axis 17 would be perpendicular to the latter, i.e. the pump beam 10 will impinge on the second face 23 of the active medium 9, preferably in the centre of the face 23 and perpendicular to it. FIG. 2 is also illustrating a position 28 and an inlet angle 29 with respect to the first face 22, which are consequently as well central and perpendicular in the case of plane parallel faces of the laser crystal, but may be different in the instance of non plane and/or non parallel faces. At any rate, as represented in FIG. 2, the pumping axis 17 and cavity axis 26 inside the laser crystal 9 coincide within the assembly tolerances favouring the well known concept of longitudinal pumping described above. Assembly tolerances in a real device may be quantified, e.g. with 0.5 mm maximum displacement in the radial direction and 1 deg. maximum angular misalignment.

The first face 22 of the active medium 9 has a multi-layer dielectric coating conferring it an anti-reflection condition (preferably R<0.5%) at the laser operating wavelength and preferably an anti-reflection condition at the pumping wavelength or wavelengths of the specific material in use. The second face 23 of the active medium 9 also has a non reflecting multi-layer dielectric coating (preferably R<0.5%) at the laser operating wavelength and highly reflecting at the pumping wavelengths (in any case, R>60%, but preferably >90% in the method and devices according to the present invention). Alternatively, as illustrated in FIG. 3, the second face 23 may receive a dielectric treatment similar to the first face 22, but in this case an optical element 31 (plate, dioptric surface or lens but not limited to), non reflecting for the laser wavelength (R<0.5%), is placed next to it, comprising a highly reflecting face 32 for the pump beam 10 (in any case, R>60%, but preferably >90% in the pumping method and in the apparatuses according to the present invention).

The high reflective dielectric coating on the second face 23 or on the above optical element 31 has the purpose and function of partially or wholly intercepting the pump beam 10 eventually not absorbed by the active medium 9 and reflect it in the arrival direction of propagation, i.e. along the pumping axis 17; defining a main incidence direction $D_i$, and a main reflected direction $D_r$, indicated as a whole with 30 in FIG. 2 and FIG. 3, for the pump beam 10, said two directions comprise a maximum angle dictated by the angular alignment tolerance of the active medium 9 or of the optical element 18 with respect to the pumping axis 17 (preferably below 1°).

Based on the absorption law of the pump power in the laser crystal or active medium 9, $P_{out}=P_{in} \exp(-\sigma_p N_0 L)$, where L is the length of the crystal doped area, $N_0$ the volumetric density of the doping atoms in the crystal and $\sigma_p$ the effective absorption section of the pump beam 10 at the wavelength of the pump being utilized, the apparatus implementing the pumping method according to the present invention is defined (for laser materials with isotropic absorption properties, such as Nd:YAG) by three parameters, i.e. crystal length L; crystal doping; pumping wavelength, so that the pump beam 10 entering the first face 22 is partially absorbed during its first crossing through the crystal 9, then reflected by the second face 23 maintaining the direction of the pumping axis 17, and then totally or nearly totally absorbed upon returning to the first face 22.

Should laser materials with strong anisotropy of the absorption section with respect to the polarization of the incident pump beam 10 be utilized, a fourth parameter has to be further considered, i.e. the polarization contents of the pump beam 10 in the main absorption directions, in order to obtain the same absorption effect distributed over two passes in the active crystal. In particular, this consideration applies to uniaxial materials, such as Nd:YVO$_4$ pumped along the crystallographic a-axis, where for instance the absorption coefficient (defined as $\sigma_p N_0$ expressed in cm$^{-1}$) at 808.8 nm with 1% at. doping equals about 40 cm$^{-1}$ for polarized light along the crystallographic c-axis, whereas it equals about 10 cm$^{-1}$ for polarized light along the a-axis, or such as Nd:GdVO$_4$ pumped along the a-axis, where the absorption coefficient at 808.2 nm with 1% at. doping equals about 74 cm$^{-1}$ for polarized light along the c-axis, and about 10 cm$^{-1}$ for polarized light along the a-axis.

Anyway, selection of the above parameters occurs in such a way to have 0.01% to 10% or preferably 0.01% to 2% of the residual pump power remaining at the exiting of the first face 22, in order to avoid both an energetic waste and excessive retro-reflection towards the pumping system.

In FIG. 4 the active crystal medium 9 is illustrated divided in focusing areas.

A first formulation of the pumping method according to the present invention has the pump beam 10 focused in the crystal volume 9 comprised between the first face 22 and two thirds of the length of the crystal 9 from the first face, so that a strong diverging radiation will meet the second face 23. The above volume is indicated with "area I" in the FIG. 4.

A second formulation of the method according to the present invention has the pump beam 10 focused in the length of the crystal 9 comprised between two thirds of the length of the crystal 9 from the first face 22 and the second face 23

(focusing "in area II", FIG. 4), so a nearly collimated radiation meets the second face 23.

A third formulation of the method according to the present invention has the pump beam 10 focused inside the crystal 9 after a reflection from the second face 23 or from the additional external optics 18 in the second pass, so a still converging pumping beam will meet the second face 23. This corresponds to a virtual focusing "in area III" of FIG. 4, i.e. substantially outside the crystal 9.

Figure 5A:
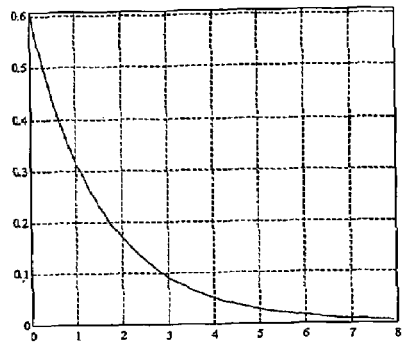
FIG. 5a shows the pump linear density absorbed for a laser crystal obtained through a pumping method of laser systems according to the known art.
Figure 5B:
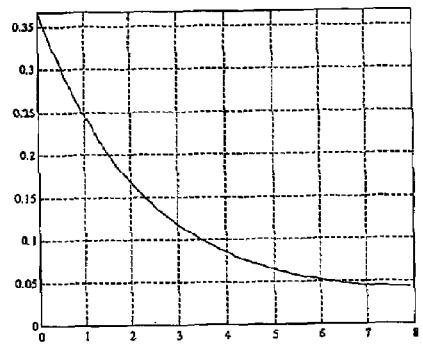
FIG. 5b shows the pump linear density absorbed for a laser crystal obtained through a pumping method of laser systems according to the present invention.

Due to the double pass of the pump beam 10, the linear density (along the longitudinal direction) of the pump power absorbed in the crystal 9, defined as $dP_{abs}/dl$, has no decreasing exponential trend as in the instance of the conventional pumping on one side alone; in particular, compared to the conventional mono-directional pumping, with an equivalent pump power absorbed and length of the crystal 9, the pumping method according to the present invention has a minor linear pump density absorbed at the inlet (first face 22) of the crystal 9 and greater near the second face 23. FIG. 5a illustrates the pump linear density absorbed for a laser crystal long 8 u. a. during mono-directional pumping, while the FIG. 5b illustrates this quantity in a crystal pumped according to the pumping method of the present invention, with an equivalent incident pump power and total power absorbed.

As it can be noticed, both the pump energy and associated residual heat are distributed more uniformly all over the length of the active crystal; many advantages (compared to the conventional mono-directional pumping method) deriving from these features justify the present innovation of such a system.

First of all, the thermal load is distributed over a greater length of thermally conductive active material; the total thermal resistance is smaller and thermal dissipation favoured; as a result, distribution of local temperature is also favoured by a fall of its peak value, and the integral value of the thermal focal length associated to the change of the refraction index with temperature (dn/dt) increases.

A minor thermal load at the entrance face of the crystal entails less deformation and, consequently, a reduction of the dioptric power of the thermal lens associated to such a phenomenon; at the same time, the pump power induced thermal fracture limit for the crystal at the entrance face will rise allowing an increase of the pump power available to the crystal. Finally, the reflector of the pump beam 10 allows maintaining very high absorption lengths with crystals of limited length, with an obvious benefit for the cost of this critical component. The pumping cross section in the active material 9 does not remain constant along the propagation direction according to common knowledge, i.e. the propagation length in the crystal required for a nearly total absorption of the pump beam may exceed twice the confocal parameter or Rayleigh range $Z_{r,p}$ of the pump beam (defined as $\pi w_{0p}^2 n_p / \lambda_p M^2$, where $w_{0p}$ is the pump beam waist in the focus, $\lambda_p$ the pumping wavelength, $n_p$ the refractive index of the laser crystal at the pumping wavelength, $M^2$ the parameter defining the beam quality of the pumping light). This confocal parameter is indicated with 36 in FIG. 2. The length of the active medium 9 may be 1.5 to 10 times the confocal parameter 36 of the pump beam 10, but preferred values range between 1.5 and 2.5 times; in this case, the absorption takes place on total propagation lengths comprised between 3 and 5 times the confocal parameter 36. A crystal length equalling twice the confocal pump parameter 36 proves particularly useful. Since the pump beam is absorbed on considerable lengths of the active medium 9, the pumping method according to the present invention has a significantly stable value of the extracted laser power when the pumping light wavelength changes. This phenomenon is the more obvious for pumping materials such as $Nd:YVO_4$, $Nd:GdVO_4$ and $Nd:YAG$ in the band around 808 nm. For an $Nd:GdVO_4$ crystal long twice the confocal parameter 36 of pump radiation, the extracted power is maintained within 10% of the nominal value with +/−1.5 nm shifting from the central pumping wavelength at 808.2 nm. Similarly, the laser beam quality may undergo sensible alterations upon changing the pumping wavelength in the same interval. At any rate, the average diameter of the pump beam 10 inside the crystal 9 is maintained higher than the diameter of the fundamental laser mode 13 $TEM_{0,0}$; in the focal point, the pump beam diameter ranges 1.2 to 2 times higher than the diameter of the fundamental laser mode 13 $TEM_{0,0}$, whereas beyond the collimated pumping area (intended equal to twice the confocal parameter 36), it becomes typically 1.2 to 10 times higher. This provision greatly reduces the aberration phenomenon due to non parabolic "tails" of the refraction index radial profile induced by pumping; at the same time, it produces a transfer of a portion of the laser power to low-index higher modes ($TEM_{n,m}$, n and $m \leq 3$).

In particular, the integral radial distribution of the absorbed pump power defined as $P_{int}(r) = \int P_{ass}(r) dl$, where r is the radial coordinate perpendicular to the pumping axis 27, has been analysed, and an equivalent diameter $d_{eq}$ equalling twice the beam radius at $1/e^2$ of the distribution $P_{int}(r)$ defined. Therefore, assuming that the laser mode remains collimated when passing through the active material and its diameter D can be defined equalling twice the beam radius at $1/e^2$, the pumping method according to the present invention provides that the ratio of both defined quantities, $D/d_{eq}$, will remain below 0.8.

It can also be proved that once focusing optical means of the pump beam 10 have been selected, the value of such a ratio and, consequently, a pumping energy transfer from the fundamental mode to the higher modes can be easily and advantageously changed by displacing the position of the pump beam focus in the laser crystal 9 and/or changing the operating wavelength of the pumping laser diodes. Advantageously, the pumping system can undergo a simple reconfiguration for operation with different modal contents without altering the structure of the laser resonator: using a pump source having a radially symmetric transverse distribution with respect to the propagation direction and a crystal with a length equalling twice the confocal pump parameter 36, laser beam qualities ranging $M^2=1.3$ to $M^2=2.2$ can be measured upon changing the parameters indicated, whereas this value can be extended up to $M^2 \geq 5$ using longer crystals.

The pumping method according to the present invention described above is optimised for pump powers ranging from 5 to 60 W, but it is conceived for adaptation to higher pump powers using laser crystals appropriately adapted to such a requirement.

Figure 6:
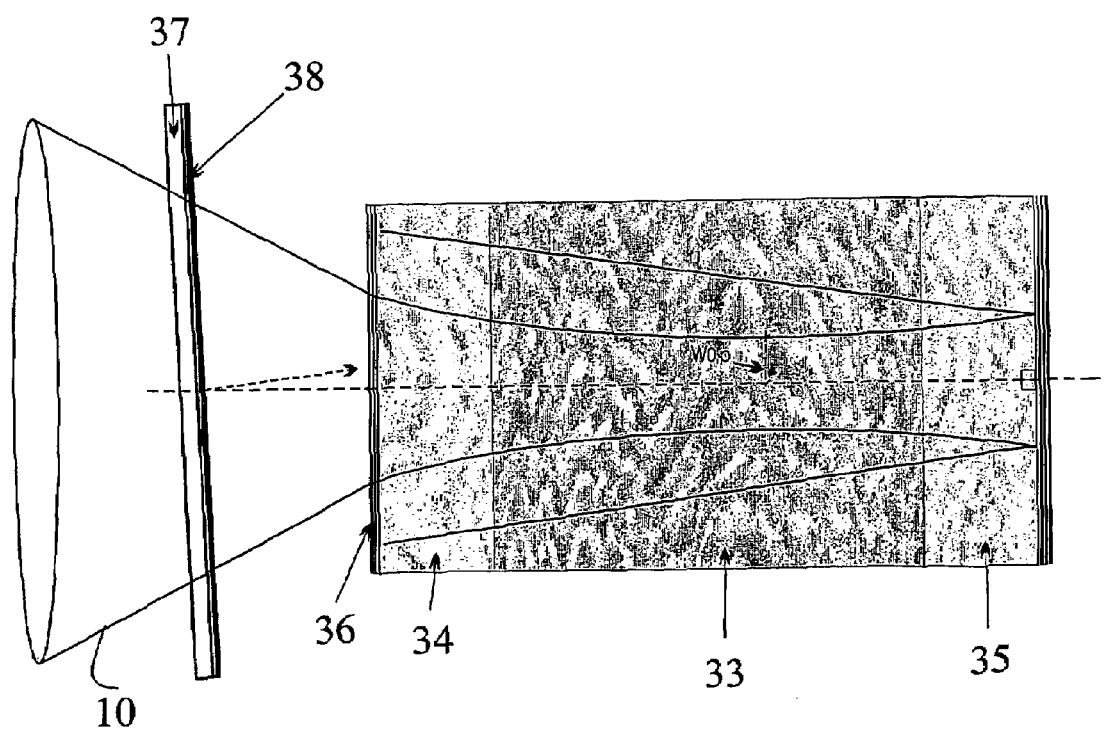
FIG. 6 shows a basic schematics of a further embodiment of the pumping method of laser systems according to the present invention.

FIG. 6 is illustrating an embodiment of the pumping method according to the present invention being apt to alleviate the problems of the thermal lens and thermo-mechanical stress on the first face 22 (and possibly, also on the second face 23), where an active material 33 has two end-caps 34 and 35 made from optical material joined to the crystal by means of an appropriate adhesive or better through AFB (Adhesive Free Bonding) technique; said end-caps 34 and 35 may have the same crystal lattice of the active material 33 or be different, they may be doped with the same active ion or a different one, they may have a continuous shape with the active material 33 or not. The end-caps 34 and 35 provide partial dissipation of the heat deposited on the face of the active material 33, and they strongly limit material deformation caused by the thermo-mechanical stress. A cavity mirror 36 may be placed on one of the faces of the first terminal 34 or form a separate component. Therefore, the laser crystal 9 mentioned in the previous description is replaced by a composite crystal forming the active medium 33, whereas all considerations related to the pumping method apply to the configuration of FIG. 6 without any substantial changes.

When the circulating power in the cavity exceeds average 50 W, reflectivity at the laser wavelength of the cavity mirror 36 is often not high enough and a portion of the radiation in the cavity is spilled by the latter; the pumping optics may focus this laser loss on the pump diodes with a consequent damaging risk. In this event, a further non reflecting dielectric surface 38 for pump radiation must be introduced, which is highly reflecting to the laser light between the laser mirror and the pumping diodes; according to an embodiment, this dielectric treatment may be placed on one face of the launching optic assembly 15; in another embodiment represented in FIG. 6, an appropriate plate 37 tilted by a small angle with respect to the cavity reflecting surface can be introduced on the pump path outside the cavity; in another embodiment, the light of the pumping diodes is injected in a fibre optic, which is efficiently protective against back reflections of the cavity laser light.

Figure 7:
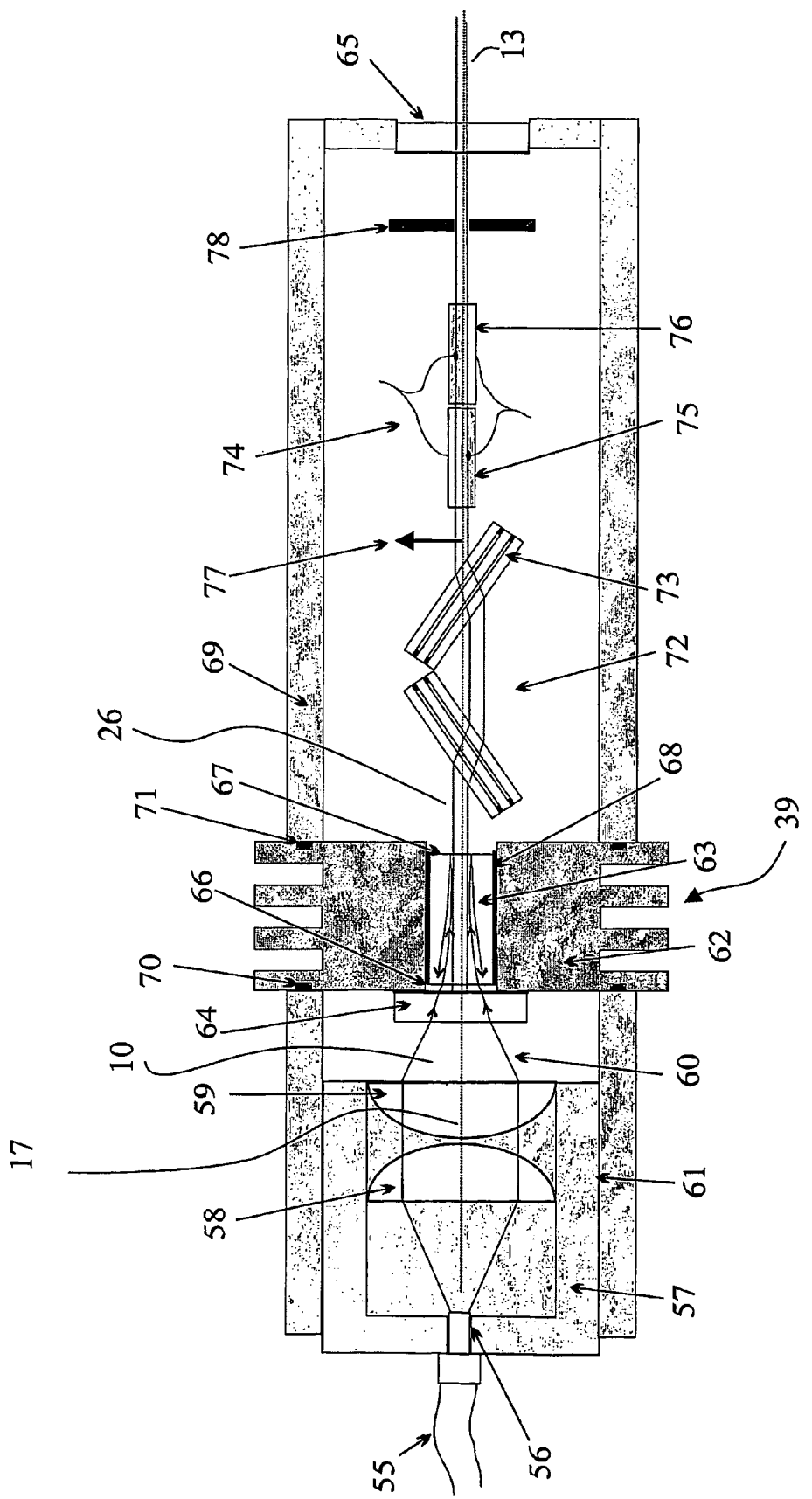
FIG. 7 shows a basic schematics of a laser apparatus implementing the pumping method of laser systems according to the present invention.

FIG. 7 is illustrating a laser system being apt to operate according to the pumping method of the present invention.

The pumping source consists of a laser diodes system not shown in the figure, coupled by means of a fibre optic 55; according to the diodes device being used, 55, 30 or more watts of optical power are available at the fibre outlet. The fibre 55 is inserted through a connector 56 in a movable pumping objective 57 having inside a lens 58 provided for collimation and a lens 59 for focusing pump radiation 60. Said movable pumping objective 57 converts the diverging radiation from the fibre optic 55 into a radiation being focused in a point located at a precise distance from the terminal surface of the objective 57. The entire objective 57 is movable along the longitudinal axis of the laser cavity described hereafter through a guide system 61 maintaining the pumping axis parallel to the cavity axis (typically within 0.5 degrees). The sliding movement of the movable objective 57 can be accurately adjusted and stopped by means of a locking system. A copper block 62 finned on the edges containing a laser crystal 63 is located directly downstream of the movable pumping objective 57. The copper block 62 is coated with a thin golden layer. The face of the copper block facing the objective 57 is perfectly perpendicular to the cavity axis and has a mirror 64, highly transmitting for the pumping light, fastened on it, which is highly reflecting for the cavity laser light. The distance from the second crystal face to the first mirror face 64 is less than the distance from the focusing point to the face of the objective 57, so that the movement of the pump objective 57 ensures free displacement of the focusing point of the pump beam 10 in the laser crystal 63. The laser crystal 63 is located inside the laser cavity identified by the axis 26, delimited in the specific case between the mirror 64 and a partial reflecting mirror 65 spilling the output beam; in the device described by way of non limiting example, this is Nd:GdVO$_4$ cut in the form of a parallelepiped with a square base and plane/parallel faces perpendicular to the crystallographic a-axis. The square base has a side chosen equal to about 5 times the diameter of the pumping focal spot, in order to avoid any interferences between the side walls of the crystal and the pump light. The longitudinal axis of the crystal is oriented parallel to cavity optical axis within the assembly tolerance limit, which can be quantified as 0.5 deg. The first face 66 of the crystal 63 is a anti-reflection face for the laser light and pump light, the second face 67 of the crystal is a anti-reflection face for the laser light, whereas it reflects more than 93% of the incident pump light. The length of the crystal 63 is about twice the confocal parameter of the pump radiation downstream of the focusing system, so the total absorption of the pump light is performed over a length equalling about 4 times the confocal parameter. The parameter $d_{eq}$ defined above and consequently the number of transverse modes oscillating in the cavity can be changed moving the movable objective 57 with respect to the crystal 63 and changing the diodes wavelength through the relevant temperature control.

The crystal 63 is assembled in its seat consisting of two halves through a thermo-mechanical adapting interface 68 about 0.1 mm thick made from an Indium based alloy. The intimate contact between the crystal and alloy and between the alloy and copper is warranted by means of a compression assembly procedure under controlled temperature. In the copper assembly the crystal 63 dissipates the heat through the interface alloy; by way of conduction, the heat reaches the assembly peripheral fins and dissipates in the environment by convection (natural or forced) and by irradiation. Some of the heat is transmitted by conduction to a laser casing 69 and dissipated in the environment as well. Two seals 70 and 71 are used for sealing the joint between the copper block 62 and the remaining casing 69.

The assembly, indicated as a whole with 39, can provide several embodiments, such as having the crystal 63 actively thermo-controlled by means of a thermoelectric element appropriately contacted to the metallic assembly 39 of the crystal, which is thermally isolated with respect to the remaining laser system, whereas the thermoelectric element dissipates the heat on the laser system casing 69. In another embodiment, the crystal 63 can be actively cooled through a liquid refrigeration flow in one or more channels obtained inside the crystal mount assembly. In general, it is important to have the heat dissipating method in the crystal 63 conveying the heat through all crystal side surfaces to the metallic assembly manufactured with high thermal conductivity materials; in particular, if this assembly is made from copper, it should be coated with one or more thin gold, nickel, palladium based layers, or other material preventing oxidation and ensuring heat dissipation by irradiation, convective exchange or forced ventilation with the environment air, and conduction to the remaining laser casing.

A polarizer 72 is located directly downstream of the laser crystal 63 of FIG. 7. Directly downstream of the polarizer 72 an electro-optical modulator 74 is appropriately located with respect to the polarization direction 77. A mode selection element 78 can be located in the terminal length of the cavity. Using a pump of about 46 W, the device produces about 20 W laser power at the wavelength of 1062.9 nm in a continuous wave condition, with the parameter $M^2$ ranging 1.3 to 2 and with 0.5 slope efficiency.

The pumping method according to the present invention can be adapted to any active material among the cited ones, but it is particularly conceived for application to crystals with favourable spectroscopic and thermo-mechanical properties, as follows:

Nd:YAG, with atomic doping concentration ranging from 0.1% at. to 0.1% at. for pumping at wavelengths between 803 and 820 nm, or with a concentration ranging from 0.2% at. to 1.2% at. for pumping with polarized or non polarized light at wavelengths between 880 and 900 nm;

Nd:YVO$_4$, with atomic doping concentration ranging from 0.04% at. to 0.8% at. for pumping with polarized or non polarized light at wavelengths between 795 and 825 nm (in particular wavelengths around 806 nm, 809 nm, 813 nm and 816 nm) or with a concentration ranging from 0.1% at. to 2.0% at. for pumping with polarized or non polarized light at wavelengths between 875 e 895 nm (in particular a wavelength around 879 nm);

in particular, Nd:GdVO$_4$ with atomic doping concentration ranging from 0.02% at. to 0.8% at. for pumping with polarized or non polarized light at wavelengths between 795 and 825 nm (in particular wavelengths around 806 nm, 808 m, 813 nm 815 nm) or with a concentration ranging from 0.1% at. to 2.0% at. for pumping with polarized or non polarized light at wavelengths between 875 e 895 nm (in particular a wavelength around 879 nm); the latter should be considered a preferred active material for the pumping method according to the present invention, since its laser absorption and emission features are excellent and very similar to those of Nd:YVO$_4$, whereas its thermal conductivity, about 12 W/mK along the direction <110>, results practically double compared to Nd:YVO$_4$ (about 5 W/mK along the direction <001>and about 5 W/mK along the direction <100>) and averagely comparable with Nd:YAG (about 11 W/mK). The higher thermal conductivity causes an easier heat dissipation from the material, globally reducing all bad effects of thermal and thermo-mechanical nature.

In particular, coherently with the scopes of the pumping method according to the present invention, pumping at a wavelength over 850 nm is suggested for all cited materials, above all near 880 nm (885 nm for Nd:YAG and about 879 nm for Nd:YVO$_4$ and Nd:GdVO$_4$). These pumping wavelengths are preferable compared to the conventional ones (focused around 808 nm), due to a lower quantum defect in the laser transition; for instance, referring to the main laser wavelength of about 1064 nm, a fraction (1-808/1064)=0.24 of energy associated to the pump photon at 808 nm wavelength is dispersed in heat, whereas only a fraction (1-880/1064)=0.17 of the energy associated to the pump photon at 880 nm undergoes the same condition. Therefore, with an equal emission of laser photons (and consequent average power extracted), about 30% less heat associated with quantum defect is deposited in the laser crystal.

Figure 8:
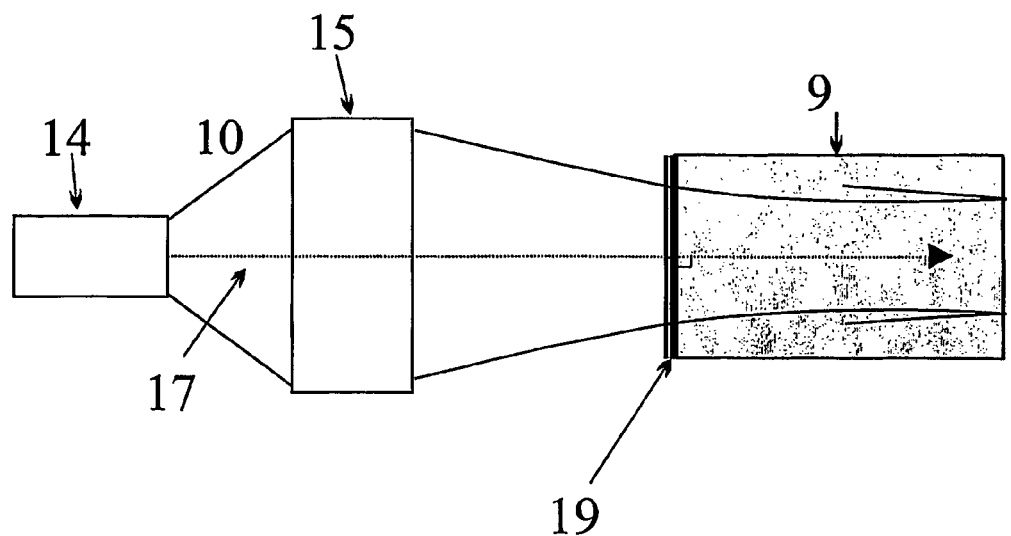
FIG. 8 shows a basic schematics of a further embodiment of the pumping method of laser systems according to the present invention.
Figure 9:
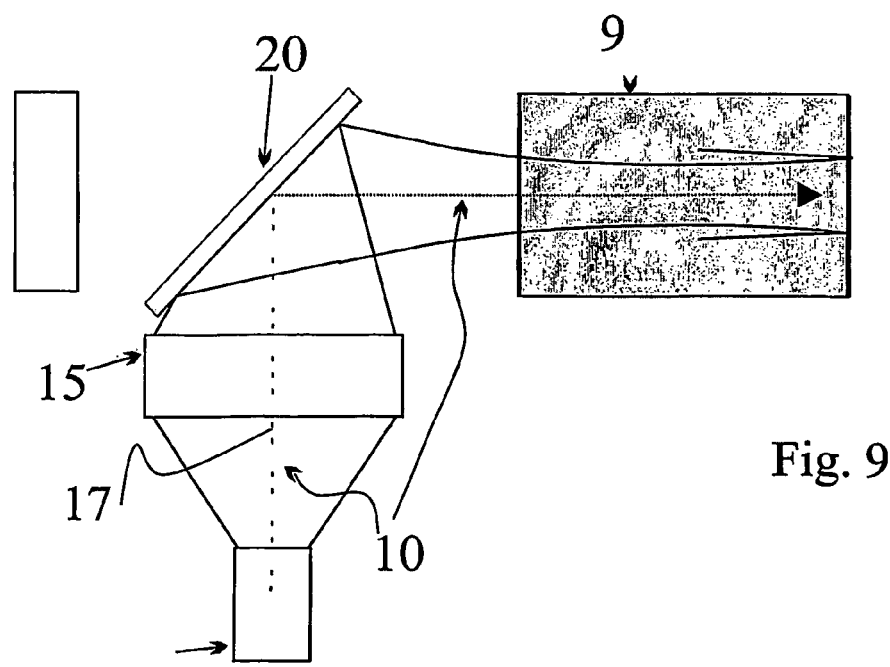
FIG. 9 shows a basic schematics of a further embodiment of the pumping method of laser systems according to the present invention.

FIG. 8 and FIG. 9 are illustrating two possible embodiments of the pumping method concerning the way the pump beam should converge on the active medium.

In the diagram shown in FIG. 8, the pump beam 10 enters the cavity through a highly reflecting dielectric coating 19 for the laser light and, preferably, non reflecting for the pump light, located directly on the terminal face of the laser crystal, i.e. of the active medium 9.

The embodiment illustrated in FIG. 9 has the pump beam 10 entering the cavity through a tilted plate 20 arranged in the cavity with an angle between 20° and 70° with respect to the axis of the cavity itself; an appropriate dielectric coating makes its two faces non reflecting (preferably R<0.5%) to the laser light, but highly reflecting for the pump beam 10, at the relevant incidence angle, on the face facing the active medium 9 and pump source 14.

As noticed above, the pumping method according to the present invention uses a selection of pumping parameters, which involves laser cavity operation in a slightly multi-modal condition, i.e. the value of the parameter $M^2$ for the output beam is preferably between 1.3 and 6.

The present material processing market requires development of sources with an ever increasing brightness; in the field of laser marking and engraving, this process does not necessarily require maintaining beam quality at diffraction limit (TEM$_{00}$). Actually, this application typically requires to be able to focus the laser beam in a smaller spot size (such as a diameter smaller than 0.2 mm) even if not at diffraction limit; due to the standard focusing objectives used in this field, this can be done only if the laser source has a controllable optical quality with a lower $M^2$ value than a fixed limit (e.g. $M^2$<10). As already described above, the conventional scheme for pumping solid state laser systems for marking and engraving applications involves energetic activation of a generally greater section of the active medium than the cross-section of the fundamental eigen-mode of the stable cavity in which it operates and consequent operation of the laser oscillator on several higher order modes, which saturate power extraction. The laser marking and engraving systems so conceived are suitable for generating high powers (such as from a few watt to many tens watt), but once the absorption efficiency requirement of the pump light has been established, they do not allow a control of the number of excited higher modes and consequently of the laser beam quality. In order to adapt the source beam quality in these multi-modal laser systems for marking and engraving applications to the specific requirements, an improvement of the source beam quality is normally obtained either reducing the cross-section dimension of the active material (no longer absorbing all the pump energy) or suppressing the higher order modes oscillating in the cavity (space filtering); in both cases, a quality increase can be obtained to the detriment of the pumping efficiency. Therefore, a marking system based on a multi-modal solid state laser with side pumping and beam quality perfectly suitable for a marking and engraving application will have a limited pumping efficiency, and consequently high costs, consumptions and overall dimensions. Advantageously, the method provided by the present invention allows overcoming the above limits of the present laser marking systems, since the use of a longitudinal pumping scheme ensures, on one hand, to maintain a high absorption of the pump light and, on the other hand, to control the optical quality of the laser beam generated by the excitation of a very reduced cross section of active material (sustaining a limited and controlled number of higher order modes). In particular, the choice of operating the laser source longitudinally pumped in a slightly multi-modal condition ($M^2$>1.3 and, e.g. $M^2$<10) allows to reach high output powers (and consequently process speeds) efficiently at low costs, maintaining at the same time the space resolution level required by the application.

The laser slope efficiency that can be reached by this method with the use of Nd:YVO$_4$ or Nd:GdVO$_4$ as active materials is higher than 0.5 if the parameter $M^2$ ranges between 1.3 and 2, and higher than 0.55 if the parameter $M^2$ ranges between 2 and 6; utilizing Nd:YAG, Nd:YAP, Nd:BYF or Nd:YLF as active materials, it is higher than 0.35 if the parameter $M^2$ is between 1.3 and 2, and higher than 0.4 if the parameter $M^2$ is between 2 and 6. Moreover, according to the present method, the choice of an active material with a high thermal conductivity and high emission cross-section at the laser wavelength will maintain the above efficiencies also in those systems with a very high output power (e.g. higher than 50 W); therefore, in the method according to the present invention the preferred material is Nd:GdVO$_4$.

The laser cavity can operate with a lower value of the parameter $M^2$ than 1.3 inserting an aperture as the one illustrated by the mode selection element 78 of FIG. 7 with the purpose of introducing losses to TEM$_{0,0}$ for the higher order modes; this can be physically obtained by means of an aperture with a calibrated diameter on the laser beam path in the cavity (pinhole) or through an optical element locally selective in transmission, such as (but not limited to) a saturable absorber transmitting the more intense portions of the laser beam, tending to naturally select $TEM_{0,0}$ starting from low index modal distributions. A preferred saturable absorber is $Cr^{4+}$:YAG or other solid state crystalline or glass material.

As it is also well known, a high power laser cavity operating in a non strictly single transverse mode condition and with an intense thermal lens involves greater difficulties for correct operation under giant pulse regime, also known as repetitive Q-switching. This condition will fraction the energy made available for the continuous laser action in discreet pulses of the duration in the order of nanoseconds, which reach peak powers from a few kW up to MW and are ideal for generating strong interactions with the material.

This condition is commonly obtained inserting an acoustic-optical or electro-optical modulator in the resonator. At the state of the art, electro-optical modulators, very efficient for Q-switching of multi-modal lasers, have some strong practical limitations; first of all, they require a polarizing element in the cavity (a plate or polarizing prism): the latter introduces considerable power losses due to thermal depolarization with the conventional active material Nd:YAG (which emits non polarized laser light). Moreover, the conventional electro-optical Q-switches operate through switching of very high voltages (in the order of several kV) applied to one or more electro-optical crystals: often, both the complexity and fragility of the electronic systems required for driving the devices discourage their use, above all in case of pulse repetition frequencies of several kHz (at these frequencies the switching losses may become such to overcharge, often irremediably, the electronic driving system). Conventionally, the most attractive alternative consists of the acoustic-optical modulator, whose maximum efficiency is anyway warranted within a well limited angular acceptance of the laser beam to be modulated.

In the case of laser cavities operating in multi-modal condition, with a strong thermal lens in the active material and high laser gain, the mix of laser modes propagates in the resonator with a divergence parameter often beyond the angular acceptance of the Q-switching device, and the latter becomes poorly efficient. Moreover, the optical switching front of an acousto-optical Q-switch lasts minimum 150-200 ns each mm of laser beam diameter; operating with high laser gains in the active material (as it happens with strongly pumped $Nd:YVO_4$ or $Nd:GdVO_4$), the giant pulse grows in the cavity while the Q-switch is not yet fully open, with consequent losses due to diffraction. Vice-versa, electro-optical systems are not subject to this limitation, as they have quite shorter switching times.

Since the above method applied to a good number of listed materials, in particular Nd:YAG, $Nd:YVO_4$, $Nd:GdVO_4$, involves operation of the laser cavity in a non single-mode condition and with an intense thermal lens, it is appropriate to illustrate a few methods for obtaining an efficient operation of such cavities in Q-switching condition (FIG. 7 is anticipating an implementation through the polarizer 72 and electro-optical Q-switch 74).

Operation of the resonator in a passive Q-switching condition can be caused using an appropriate saturable absorber (such as but not limited to Cr:YAG, Vd:YAG); the energy, the pulse repetition rate and pulse duration depend on the pumping power applied to the active medium and not from an external control. This Q-switching method is very efficient and reliable; the presence of a saturable absorber in the cavity also produces a filtering effect of the cavity high order transverse modes, improving the beam quality of the output mode. Vice-versa, the strictest limitation of this method is its inability of changing both the repetition frequency and pulse energy electronically.

This limitation can be overcome using an active Q-switch.

According to a first embodiment, an acoustic-optical device can be utilized, the values and limitations of which have already been described.

Figure 10:
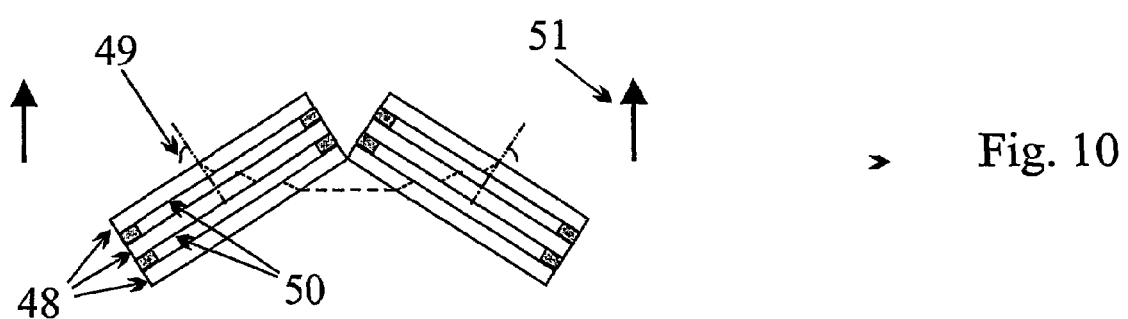
FIG. 10 shows a basic schematics of the polarizer of the apparatus of FIG. 7.
Figure 11:
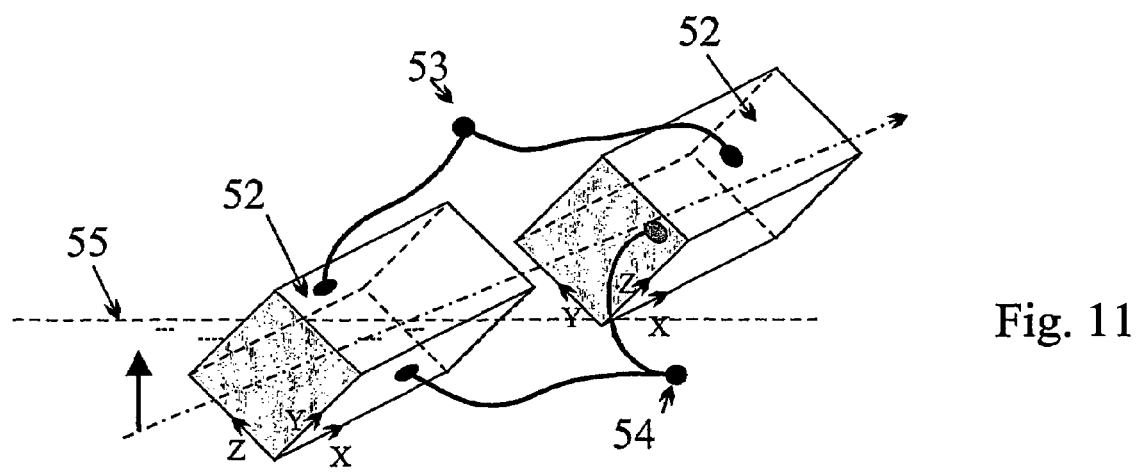
FIG. 11 shows a basic schematics of the modulator of the apparatus of FIG. 7.

FIG. 10 and FIG. 11 represent in detail the polarizer 72 and electro-optical Q-switch 74 of FIG. 7, which imply the use of electro-optical devices based on the use of non linear crystals presently available on the market, such as RTA, RTP, $LiNbO_3$ (but not limited to). The electro-optical device is particularly conceived for its use combined with polarized emission laser materials, in particular $Nd:YVO_4$, $Nd:GdVO_4$, Nd:YLF, Nd:YAP, Nd:SFAP, but not limited to them or to their polarized emission feature. The use of a strongly polarized emission material, such as $Nd:YVO_4$ or $Nd:GdVO_4$, will limit the insertion losses of a cavity polarizer system to the intrinsic losses not depending on polarization (such as Fresnel or absorption losses). The polarizer element, which is arranged in a way to warrant a maximum transmission at the likely direction of a polarized emission of the laser material, can be obtained using one or more dielectric coated polarizing plate or a polarizer prism (Glan Thompson, or 'Polarizing beam splitter cube' or other equivalent operating device). FIG. 10 illustrates an embodiment with a double pile of polarizing plate 48 made from optical glass or crystalline material (for example quartz, sapphire or YAG) stacked parallel and air spaced 50; both piles are placed one at the appropriate Brewster angle $\vartheta_b$ 49, the other at $180°-\vartheta_b$ with respect to a desired polarization plane 51.

FIG. 11 is representing an electro-optical device consisting of a temperature compensated pair of RTP crystals 52; the crystals 52 are cut in the form of a parallelepiped along the main axis x y and z and conductive electrodes 53 and 54 connected two by two are arranged on the opposite faces defined by the x y axes. The faces z-y are optically polished and have an anti-reflection coating at the operating laser wavelength. An input beam polarization axis is arranged at 45° with respect to the direction of the axis z or y. The preferred dimension of the sides z and y ($l_z$ and $l_y$) is between 1 and 4 mm, the preferred length $l_x$ of the crystals (axis x) ranges from 3 to 10 mm. The preferred choice of a smaller ratio $l_z/l_x$ than 0.4 tends to obtain a so-called "$\lambda/4$ voltage" less than 1000 V for the wavelength 1064 nm from the electro-optical device. These voltages are easily withstood and can be rapidly switched by means of simple electronic power components which have been available at the state of the art for quite a number of years. The RTP electro-optical device combined with a low loss polarizer as described above will adequately solve the problems related to Q-switching modulation for slightly multi-modal laser with a strong thermal lens; this device has a very high angular acceptance and switching time equalling a few (<10) ns, whereas the driving electronics of the device is simple and safely reliable within $10^{18}$ switching operations; the RTP material responds correctly to modulation in a range of repetition frequencies from 0 to 500 kHz. The device is used in the so-called "$\lambda/4$ scheme", with the polarizer interlaying between the active material and the modulator: applying the $\lambda/4$ voltage to the device, light passing through the polarizer undergoes a 90 degrees polarization rotation in two subsequent passes of the modulator, being strongly attenuated when passing through the polarizer, with a consequent cavity extinction. Upon removing the $\lambda/4$ voltage, the polarization goes unchanged through the modulator and the laser cavity operates above the threshold, generating a giant pulse.

From the above description the features of the present invention are clear, and also its advantages will be clear.

The pumping method of laser systems according to the present invention provides longitudinally diodes pumped solid state laser systems with high efficiency and a high brightness due to the choice of operating in a slightly multimodal condition with an output beam quality (parameter $M^2$) over 1.3 and, preferably, less than 6 times diffraction limit. In particular, this is due to the pump beam not being perpendicularly aligned to the first face of the active crystal, but rather to a second optical surface, which reflects the unabsorbed portion (first pass in the active medium) of the pump beam along the direction of incidence, redirecting the residual pump inside the active crystal 9.

Advantageously, moreover, the pumping method of laser systems according to the present invention will distribute absorption more evenly inside the active crystal, utilizing more favourable local conditions for residual heat dissipation.

Advantageously, the pumping method of laser systems according to the present invention will considerably reduce the thermal load in the active material through the appropriate selection of the active material, doping parameters and pumping wavelength.

Advantageously, too, the pumping method of laser systems according to the present invention will efficiently counteract the limitations caused by the thermal lens and thermo-mechanical stress due to the increase of the pump power absorbed in the laser material through the appropriate selection of the physical structure of the active material and associated heat removal system.

The pumping method of laser systems according to the present invention will ensure efficient operation of the laser having a low modal contents also in a giant pulse or Q-switching regime. Finally, the pumping method of laser systems according to the present invention is suitable for improving micro-machining techniques for laser marking and engraving.

It is obvious that many changes are possible for the man skilled in the art to the pumping method and apparatus thereof, described above, without departing from the novelty of the inventive idea, and it is clear that in practical actuation of the invention the components may often differ in form, size, proportions and materials employed from the ones described above by way of example, and be replaced with technical equivalent elements.

The invention claimed is:

1. A pumping method of discrete-elements solid state laser systems pumped by semiconductor laser diodes, the method comprising sending a pump beam having a pump power greater than 10 W through an active medium that includes a first face to be crossed by the pump beam, and a second face to be crossed by the pump beam along a pumping axis being associated to the pump beam, the active medium being inserted in a laser cavity having a cavity propagation axis, wherein the pumping axis coincides with the cavity propagation axis inside the active medium, and is perpendicular to an optical surface met by the pump beam after crossing the first face of the active medium, wherein the optical surface is partially reflecting at a wavelength of the pump beam and non reflecting at a wavelength at which a laser beam propagates in the laser cavity;

wherein the pump beam is focused in a volume of the active medium between the first face of the active medium and two thirds of a length starting from the first face (area I), so that a strongly divergent radiation meets the second face of the active medium.

2. A pumping method of discrete-elements solid state laser systems pumped by semiconductor laser diodes, the method comprising:

sending a pump beam through an active medium that includes a first face to be crossed by the pump beam, and a second face to be crossed by the pump beam along a pumping axis being associated with the pump beam, the active medium being inserted in a laser cavity having a cavity propagation axis, wherein the pumping axis coincides with the cavity propagation axis inside the active medium, and is perpendicular to an optical surface met by the pump beam after crossing the first face of the active medium, wherein the optical surface is partially reflecting at a wavelength of the pump beam and non reflecting at a wavelength at which a laser beam propagates in the laser cavity, wherein the pump beam is focused in the volume of the active medium between two thirds of a length starting from the first face of the active medium and the second face of the active medium (area II), so that the distance of the second face from the pump beam waist position is shorter than the pump beam confocal parameter ($Z_{r,p}$).

3. A pumping method of discrete-elements solid state laser systems pumped by semiconductor laser diodes, the method comprising:

sending a pump beam through an active medium that includes a first face to be crossed by the pump beam, and a second face to be crossed by the pump beam along a pumping axis being associated with the pump beam, the active medium being inserted in a laser cavity having a cavity propagation axis, wherein the pumping axis coincides with the cavity propagation axis inside the active medium, and is perpendicular to an optical surface met by the pump beam after crossing the first face of the active medium, wherein the optical surface is partially reflecting at a wavelength of the pump beam and non reflecting at a wavelength at which a laser beam propagates in the laser cavity, wherein the optical surface is the second face of the active medium and the optical surface reflects more than 60% of the light at a wavelength of the pump beam, and the light traveling along the pumping axis is reflected on itself at the optical surface within 2 degrees tolerance.

4. A pumping method of discrete-elements solid state laser systems pumped by semiconductor laser diodes, the method comprising:

sending a pump beam through an active medium that includes a first face to be crossed by the pump beam, and a second face to be crossed by the pump beam along a pumping axis being associated with the pump beam, the active medium being inserted in a laser cavity having a cavity propagation axis, wherein the pumping axis coincides with the cavity propagation axis inside the active medium, and is perpendicular to an optical surface met by the pump beam after crossing the first face of the active medium, wherein the optical surface is partially reflecting at a wavelength of the pump beam and non reflecting at a wavelength at which a laser beam propagates in the laser cavity, and maintaining a larger average diameter of the pump beam inside the active medium than the diameter of a fundamental laser mode $TEM_{0,0}$ of the laser beam.

5. A pumping method of discrete-elements solid state laser systems pumped by semiconductor laser diodes, the method comprising:

sending a pump beam through an active medium that includes a first face to be crossed by the pump beam, and a second face to be crossed by the pump beam along a pumping axis being associated with the pump beam, the active medium being inserted in a laser cavity having a cavity propagation axis, wherein the pumping axis coincides with the cavity propagation axis inside the active medium, and is perpendicular to an optical surface met by the pump beam after crossing the first face of the active medium, wherein the optical surface is partially reflecting at a wavelength of the pump beam and non reflecting at a wavelength at which a laser beam propagates in the laser cavity, and maintaining a ratio between a diameter D, calculated at $1/e^2$ of a fundamental laser mode in the active medium, and an equivalent diameter $(d_{eq})$, which is twice the pump beam radius at $1/e^2$ of the longitudinally integrated distribution $P_{int}(r)$ along the longitudinal coordinate, of the absorbed pump power spatial distribution, less than or equal to 0.8.

6. A pumping method of laser systems according to claim 5, further comprising changing the value of the ratio $D/d_{eq}$ by one or more of displacing the position of the pumping focus in the active medium, and changing the emission wavelength of the semiconductor laser diodes.

7. A pumping method of discrete-elements solid state laser systems pumped by semiconductor laser diodes, the method comprising:

sending a pump beam through an active medium that includes a first face to be crossed by the pump beam, and a second face to be crossed by the pump beam along a pumping axis being associated with the pump beam, the active medium being inserted in a laser cavity having a cavity propagation axis, wherein the pumping axis coincides with the cavity propagation axis inside the active medium, and is perpendicular to an optical surface met by the pump beam after crossing the first face of the active medium, wherein the optical surface is partially reflecting at a wavelength of the pump beam and non reflecting at a wavelength at which a laser beam propagates in the laser cavity, maintaining a larger average diameter of the pump beam inside the active medium than the diameter of a fundamental laser mode $TEM_{0,0}$ of the laser beam, and using a pump source, whose transverse distribution is radially symmetrical with respect to the pumping axis of the pump beam, and a crystal with a length ranging from 1 to 3 times the pump beam confocal parameter, in order to obtain laser beam qualities ranging between $M^2=1.3$ and $M^2=2.2$.

8. A pumping method of laser systems according to claim 3, wherein the pump beam is virtually focused in the active medium beyond the second face of the active medium (area III), so that a still convergent pump beam meets the second face of the active medium.

9. A pumping method of laser systems according to claim 3, wherein the optical surface is the second face of the active medium and the optical surface reflects at least 90% of the light at the wavelength of the pump beam.

10. A pumping method of laser systems according to claim 1, wherein the second face of the active medium transmits light at a wavelength of the pump beam, and the optical surface includes an optical element outside the active medium reflecting the pump beam in a direction coinciding with the incidence direction within 2° tolerance.

11. A pumping method of discrete-elements solid state laser systems pumped by semiconductor laser diodes, the method comprising:

sending a pump beam through an active medium that includes a first face to be crossed by the pump beam, and a second face to be crossed by the pump beam along a pumping axis being associated with the pump beam, the active medium being inserted in a laser cavity having a cavity propagation axis, wherein the pumping axis coincides with the cavity propagation axis inside the active medium, and is perpendicular to an optical surface met by the pump beam after crossing the first face of the active medium, wherein the optical surface is partially reflecting at a wavelength of the pump beam and non reflecting at a wavelength at which a laser beam propagates in the laser cavity, and wherein the pump beam is not fully absorbed after a first pass through the active medium, but is mostly absorbed after two passes in the active medium, with a power of the pump beam after two passes being less than 50% of the power of the pump beam prior to entering the active medium.

12. A pumping method of laser systems according to claim 1, wherein an absorption length of the pump beam and volumetric distribution of the population inversion in the active medium are determined by the type and doping of the material of the active medium.

13. A pumping method of laser systems according to claim 1, wherein an absorption length of the pump beam and volumetric distribution of the population inversion in the active medium are determined by means of one or more of a wavelength of the pump beam, the length of the active medium, and the polarization state of the pump beam.

14. A pumping method of laser systems according to claim 1, wherein the length of the active medium is 1 to 10 times longer than a confocal parameter of the pump beam.

15. A pumping method of discrete-elements solid state laser systems pumped by semiconductor laser diodes, the method comprising:

sending a pump beam through an active medium that includes a first face to be crossed by the pump beam, and a second face to be crossed by the pump beam along a pumping axis being associated with the pump beam, the active medium being inserted in a laser cavity having a cavity propagation axis, wherein the pumping axis coincides with the cavity propagation axis inside the active medium, and is perpendicular to an optical surface met by the pump beam after crossing the first face of the active medium, wherein the optical surface is partially reflecting at a wavelength of the pump beam and non reflecting at a wavelength at which a laser beam propagates in the laser cavity, and providing for changing a position of the pump beam focus or a wavelength of the semiconductor laser diodes.

16. A pumping method of laser systems according to claim 1, further comprising employing more than one wavelength in the pump beam.

17. A pumping method of laser systems according to claim 2, wherein the second face of the active medium transmits light at a wavelength of the pump beam, and the optical surface includes an optical element outside the active medium reflecting the pump beam in a direction coinciding with the incidence direction within 4° tolerance.

18. A pumping method of laser systems according to claim 2, wherein an absorption length of the pump beam and volumetric distribution of the population inversion in the active medium are determined by the type and doping of the material of the active medium.

19. A pumping method of laser systems according to claim 2, wherein an absorption length of the pump beam and volumetric distribution of the population inversion in the active medium are determined by means of one or more of a wavelength of the pump beam, the length of the active medium, and the polarization state of the pump beam.

20. A pumping method of laser systems according to claim 2, wherein the length of the active medium is 1 to 10 times longer than a confocal parameter of the pump beam.

21. A pumping method of laser systems according to claim 4, wherein the second face of the active medium transmits light at a wavelength of the pump beam, and the optical surface includes an optical element outside the active medium reflecting the pump beam in a direction coinciding with the incidence direction within 4° tolerance.

22. A pumping method of laser systems according to claim 4, wherein an absorption length of the pump beam and volumetric distribution of the population inversion in the active medium are determined by the type and doping of the material of the active medium.

23. A pumping method of laser systems according to claim 4, wherein an absorption length of the pump beam and volumetric distribution of the population inversion in the active medium are determined by means of one or more of a wavelength of the pump beam, the length of the active medium, and the polarization state of the pump beam.

24. A pumping method of laser systems according to claim 4, wherein the length of the active medium is 1 to 10 times longer than a confocal parameter of the pump beam.

25. A pumping method of laser systems according to claim 5, wherein the second face of the active medium transmits light at a wavelength of the pump beam, and the optical surface includes an optical element outside the active medium reflecting the pump beam in a direction coinciding with the incidence direction within 4° tolerance.

26. A pumping method of laser systems according to claim 5, wherein an absorption length of the pump beam and volumetric distribution of the population inversion in the active medium are determined by the type and doping of the material of the active medium.

27. A pumping method of laser systems according to claim 5, wherein an absorption length of the pump beam and volumetric distribution of the population inversion in the active medium are determined by means of one or more of a wavelength of the pump beam, the length of the active medium, and the polarization state of the pump beam.

28. A pumping method of laser systems according to claim 5, wherein the length of the active medium is 1 to 10 times longer than a confocal parameter of the pump beam.

29. A pumping method of laser systems according to claim 7, wherein the second face of the active medium transmits light at a wavelength of the pump beam, and the optical surface includes an optical element outside the active medium reflecting the pump beam in a direction coinciding with the incidence direction within 4° tolerance.

30. A pumping method of laser systems according to claim 7, wherein an absorption length of the pump beam and volumetric distribution of the population inversion in the active medium are determined by the type and doping of the material of the active medium.

31. A pumping method of laser systems according to claim 7, wherein an absorption length of the pump beam and volumetric distribution of the population inversion in the active medium are determined by means of one or more of a wavelength of the pump beam, the length of the active medium, and the polarization state of the pump beam.

32. A pumping method of laser systems according to claim 7, wherein the length of the active medium is 1 to 10 times longer than a confocal parameter of the pump beam.

33. A pumping method of laser systems according to claim 3, wherein the second face of the active medium transmits light at a wavelength of the pump beam, and the optical surface includes an optical element outside the active medium reflecting the pump beam in a direction coinciding with the incidence direction within 4° tolerance.

34. A pumping method of laser systems according to claim 3, wherein an absorption length of the pump beam and volumetric distribution of the population inversion in the active medium are determined by the type and doping of the material of the active medium.

35. A pumping method of laser systems according to claim 3, wherein an absorption length of the pump beam and volumetric distribution of the population inversion in the active medium are determined by means of one or more of a wavelength of the pump beam, the length of the active medium, and the polarization state of the pump beam.

36. A pumping method of laser systems according to claim 3, wherein the length of the active medium is 1 to 10 times longer than a confocal parameter of the pump beam.

37. A pumping method of laser systems according to claim 11, wherein the second face of the active medium transmits light at a wavelength of the pump beam, and the optical surface includes an optical element outside the active medium reflecting the pump beam in a direction coinciding with the incidence direction within 4° tolerance.

38. A pumping method of laser systems according to claim 11, wherein an absorption length of the pump beam and volumetric distribution of the population inversion in the active medium are determined by the type and doping of the material of the active medium.

39. A pumping method of laser systems according to claim 11, wherein an absorption length of the pump beam and volumetric distribution of the population inversion in the active medium are determined by means of one or more of a wavelength of the pump beam, the length of the active medium, and the polarization state of the pump beam.

40. A pumping method of laser systems according to claim 11, wherein the length of the active medium is 1 to 10 times longer than a confocal parameter of the pump beam.

41. A pumping method of laser systems according to claim 15, wherein the second face of the active medium transmits light at a wavelength of the pump beam, and the optical surface includes an optical element outside the active medium reflecting the pump beam in a direction coinciding with the incidence direction within 4° tolerance.

42. A pumping method of laser systems according to claim 15, wherein an absorption length of the pump beam and volumetric distribution of the population inversion in the active medium are determined by the type and doping of the material of the active medium.

43. A pumping method of laser systems according to claim 15, wherein an absorption length of the pump beam and volumetric distribution of the population inversion in the active medium are determined by means of one or more of a wavelength of the pump beam, the length of the active medium, and the polarization state of the pump beam.

44. A pumping method of laser systems according to claim 15, wherein the length of the active medium is 1 to 10 times longer than a confocal parameter of the pump beam.

* * * * *